United States Patent
Young et al.

(10) Patent No.: US 11,706,251 B2
(45) Date of Patent: *Jul. 18, 2023

(54) SIMULATING USER INTERACTIONS FOR MALWARE ANALYSIS

(71) Applicant: Palo Alto Networks, Inc., Santa Clara, CA (US)

(72) Inventors: Brandon R. Young, Warrenton, VA (US); Daniel Raygoza, Seattle, WA (US); Sebas Sujeen Reymond Johnson, Santa Clara, CA (US); Abhiroop Dabral, Mountain View, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/508,737

(22) Filed: Oct. 22, 2021

(65) Prior Publication Data

US 2022/0046030 A1 Feb. 10, 2022

Related U.S. Application Data

(63) Continuation of application No. 16/570,851, filed on Sep. 13, 2019, now Pat. No. 11,196,765.

(51) Int. Cl.
*H04L 29/06* (2006.01)
*H04L 9/40* (2022.01)

(52) U.S. Cl.
CPC ........ *H04L 63/145* (2013.01); *H04L 63/0254* (2013.01)

(58) Field of Classification Search
CPC .................................................. H04L 63/145
See application file for complete search history.

(56) References Cited

U.S. PATENT DOCUMENTS

| | | | |
|---|---|---|---|
| 5,983,348 A | 11/1999 | Ji | |
| 6,192,444 B1 | 2/2001 | White | |
| 7,366,652 B2 | 4/2008 | Wang | |
| 7,409,718 B1 | 8/2008 | Hong | |
| 7,475,002 B1 | 1/2009 | Mann | |

(Continued)

FOREIGN PATENT DOCUMENTS

| | | |
|---|---|---|
| WO | 2012134584 | 10/2012 |
| WO | 2013067505 | 5/2013 |

(Continued)

OTHER PUBLICATIONS

Author Unknown, A Day in the Life of a BotArmy, Damballa, 2008.

(Continued)

*Primary Examiner* — Jason K Gee
(74) *Attorney, Agent, or Firm* — Van Pelt, Yi & James LLP

(57) ABSTRACT

Simulating user interactions during dynamic analysis of a sample is disclosed. A sample is received for analysis. Prior to execution of the sample, a baseline screenshot of a system folder is generated by accessing frame buffer data stored on a graphics card. The sample is caused to execute, at least in part using one or more hypervisor instructions to move a pointing device to an icon associated with the sample. A current screenshot of the system folder is generated by accessing current frame buffer data stored on the graphics card.

31 Claims, 20 Drawing Sheets

(56) References Cited

U.S. PATENT DOCUMENTS

| | | |
|---|---|---|
| 7,496,963 B2 | 2/2009 | Shipp |
| 7,568,233 B1 | 7/2009 | Szor |
| 7,603,713 B1 | 10/2009 | Belov |
| 7,649,838 B2 | 1/2010 | Fishteyn |
| 7,664,855 B1 | 2/2010 | Freed |
| 7,779,472 B1 | 8/2010 | Lou |
| 7,805,379 B1 | 9/2010 | Adkins, III |
| 7,823,202 B1 | 10/2010 | Nucci |
| 7,870,610 B1 | 1/2011 | Mitchell |
| 7,930,273 B1 | 4/2011 | Clark |
| 7,945,908 B1 | 5/2011 | Waldspurger |
| 7,958,555 B1 | 6/2011 | Chen |
| 8,011,010 B2 | 8/2011 | Michael |
| 8,141,132 B2 | 3/2012 | Oliver |
| 8,151,352 B1 | 4/2012 | Novitchi |
| 8,201,246 B1 | 6/2012 | Wu |
| 8,209,680 B1 | 6/2012 | Le |
| 8,225,317 B1 | 7/2012 | Chiueh |
| 8,239,492 B2 | 8/2012 | Pottenger |
| 8,239,608 B1 | 8/2012 | Ginzton |
| 8,260,914 B1 | 9/2012 | Supranamaya |
| 8,291,468 B1 | 10/2012 | Chickering |
| 8,316,440 B1 | 11/2012 | Hsieh |
| 8,321,936 B1 | 11/2012 | Green |
| 8,347,100 B1 | 1/2013 | Thornewell |
| 8,359,651 B1 | 1/2013 | Wu |
| 8,364,664 B2 | 1/2013 | Bennett |
| 8,370,938 B1 | 2/2013 | Daswani |
| 8,402,529 B1 | 3/2013 | Green |
| 8,402,543 B1 | 3/2013 | Ranjan |
| 8,407,324 B2 | 3/2013 | Mcdougal |
| 8,438,639 B2 | 5/2013 | Lee |
| 8,443,363 B1 | 5/2013 | Brennan, III |
| 8,443,449 B1 | 5/2013 | Fan |
| 8,464,341 B2 | 6/2013 | Cohen |
| 8,479,295 B2 | 7/2013 | Sahita |
| 8,484,732 B1 | 7/2013 | Chen |
| 8,484,739 B1 | 7/2013 | Seshadri |
| 8,495,742 B2 | 7/2013 | Abadi |
| 8,510,827 B1 | 8/2013 | Leake |
| 8,516,591 B2 | 8/2013 | Fly |
| 8,521,667 B2 | 8/2013 | Zhu |
| 8,533,842 B1 | 9/2013 | Satish |
| 8,539,577 B1 | 9/2013 | Stewart |
| 8,566,928 B2 | 10/2013 | Dagon |
| 8,566,946 B1 | 10/2013 | Aziz |
| 8,572,740 B2 | 10/2013 | Mashevsky |
| 8,578,481 B2 | 11/2013 | Rowley |
| 8,584,239 B2 | 11/2013 | Aziz |
| 8,631,489 B2 | 1/2014 | Antonakakis |
| 8,646,071 B2 | 2/2014 | Pereira |
| 8,646,088 B2 | 2/2014 | Pistoia |
| 8,656,491 B1 | 2/2014 | Daswani |
| 8,677,487 B2 | 3/2014 | Balupari |
| 8,683,584 B1 | 3/2014 | Daswani |
| 8,707,441 B1 | 4/2014 | Cidambi |
| 8,726,386 B1 | 5/2014 | Mccorkendale |
| 8,756,691 B2 | 6/2014 | Nachenberg |
| 8,763,071 B2 | 6/2014 | Sinha |
| 8,763,125 B1 | 6/2014 | Feng |
| 8,806,647 B1 | 8/2014 | Daswani |
| 8,813,240 B1 | 8/2014 | Northup |
| 8,826,426 B1 | 9/2014 | Dubey |
| 8,838,570 B1 | 9/2014 | English |
| 8,863,288 B1 | 10/2014 | Savage |
| 8,893,124 B2 | 11/2014 | Bork |
| 8,931,088 B2 | 1/2015 | Chen |
| 8,966,625 B1 | 2/2015 | Zuk |
| 9,003,526 B2 | 4/2015 | El-Moussa |
| 9,049,221 B1 | 6/2015 | Yen |
| 9,117,079 B1 | 8/2015 | Huang |
| 9,141,801 B2 | 9/2015 | Moon |
| 9,152,694 B1 | 10/2015 | Padidar |
| 9,165,142 B1 | 10/2015 | Sanders |
| 9,183,383 B1 | 11/2015 | Yablokov |
| 9,213,838 B2 | 12/2015 | Lu |
| 9,223,962 B1 | 12/2015 | Kashyap |
| 9,245,121 B1 | 1/2016 | Luo |
| 9,294,486 B1 | 3/2016 | Chiang |
| 9,317,680 B2 | 4/2016 | Carter, III |
| 9,349,134 B1* | 5/2016 | Adams ............... G06Q 30/0248 |
| 9,361,089 B2 | 6/2016 | Bradfield |
| 9,516,039 B1 | 12/2016 | Yen |
| 9,516,053 B1 | 12/2016 | Muddu |
| 9,519,781 B2 | 12/2016 | Golshan |
| 9,591,003 B2 | 3/2017 | Johansson |
| 9,626,509 B1 | 4/2017 | Khalid |
| 9,792,430 B2 | 10/2017 | Golshan |
| 9,852,290 B1 | 12/2017 | Kirk |
| 9,894,096 B1 | 2/2018 | Daswani |
| 9,910,992 B2 | 3/2018 | Simpson |
| 10,019,575 B1 | 7/2018 | Wang |
| 10,140,303 B1 | 11/2018 | Patterson |
| 10,445,216 B2 | 10/2019 | Mola |
| 10,534,687 B2 | 1/2020 | Fahim |
| 10,534,749 B1 | 1/2020 | Miah |
| 10,621,348 B1 | 4/2020 | Ciubotariu |
| 10,956,573 B2 | 3/2021 | Zheng |
| 11,010,474 B2 | 5/2021 | Hu |
| 11,132,443 B1 | 9/2021 | Raber |
| 11,194,915 B2 | 12/2021 | Stolfo |
| 2003/0191911 A1 | 10/2003 | Kleinschnitz |
| 2004/0030913 A1 | 2/2004 | Liang |
| 2004/0107416 A1 | 6/2004 | Buban |
| 2004/0133796 A1 | 7/2004 | Cohen |
| 2005/0149726 A1 | 7/2005 | Joshi |
| 2005/0177602 A1 | 8/2005 | Kaler |
| 2005/0240756 A1 | 10/2005 | Mayer |
| 2005/0283837 A1 | 12/2005 | Olivier |
| 2006/0021029 A1 | 1/2006 | Brickell |
| 2006/0168024 A1 | 7/2006 | Mehr |
| 2007/0039053 A1 | 2/2007 | Dvir |
| 2007/0050850 A1 | 3/2007 | Katoh |
| 2007/0055711 A1 | 3/2007 | Polyakov |
| 2007/0079375 A1 | 4/2007 | Copley |
| 2007/0106986 A1 | 5/2007 | Worley, Jr. |
| 2007/0174915 A1 | 7/2007 | Gribble |
| 2007/0192857 A1 | 8/2007 | Ben-Itzhak |
| 2007/0219772 A1 | 9/2007 | Kfir |
| 2007/0261112 A1 | 11/2007 | Todd |
| 2008/0016552 A1 | 1/2008 | Hart |
| 2008/0049027 A1* | 2/2008 | Hauke ............... H04N 21/6582 |
| | | 348/E7.061 |
| 2008/0127338 A1 | 5/2008 | Cho |
| 2008/0155694 A1 | 6/2008 | Kwon |
| 2008/0177755 A1 | 7/2008 | Stern |
| 2008/0177994 A1 | 7/2008 | Mayer |
| 2008/0209562 A1 | 8/2008 | Szor |
| 2008/0229393 A1 | 9/2008 | Congdon |
| 2008/0256633 A1 | 10/2008 | Arnold |
| 2008/0262991 A1 | 10/2008 | Kapoor |
| 2008/0263658 A1 | 10/2008 | Michael |
| 2008/0263659 A1 | 10/2008 | Alme |
| 2008/0320594 A1 | 12/2008 | Jiang |
| 2009/0007100 A1 | 1/2009 | Field |
| 2009/0019547 A1 | 1/2009 | Palliyil |
| 2009/0036111 A1 | 2/2009 | Danford |
| 2009/0055928 A1 | 2/2009 | Kang |
| 2009/0077383 A1 | 3/2009 | De Monseignat |
| 2009/0144826 A2 | 6/2009 | Piccard |
| 2009/0150419 A1 | 6/2009 | Kim |
| 2009/0235357 A1 | 9/2009 | Ebringer |
| 2009/0241190 A1 | 9/2009 | Todd |
| 2009/0254989 A1 | 10/2009 | Achan |
| 2009/0265786 A1 | 10/2009 | Xie |
| 2009/0282485 A1 | 11/2009 | Bennett |
| 2009/0288167 A1 | 11/2009 | Freericks |
| 2010/0037314 A1 | 2/2010 | Perdisci |
| 2010/0043072 A1 | 2/2010 | Rothwell |
| 2010/0077481 A1 | 3/2010 | Polyakov |
| 2010/0107252 A1 | 4/2010 | Mertoguno |
| 2010/0115586 A1 | 5/2010 | Raghavan |
| 2010/0154059 A1 | 6/2010 | Mcnamee |
| 2010/0162350 A1 | 6/2010 | Jeong |

(56) References Cited

U.S. PATENT DOCUMENTS

| | | |
|---|---|---|
| 2010/0175132 A1 | 7/2010 | Zawadowskiy |
| 2010/0281458 A1 | 11/2010 | Paladino |
| 2010/0333168 A1 | 12/2010 | Herrod |
| 2011/0041179 A1 | 2/2011 | Staahlberg |
| 2011/0055923 A1 | 3/2011 | Thomas |
| 2011/0090911 A1 | 4/2011 | Hao |
| 2011/0099620 A1 | 4/2011 | Stavrou |
| 2011/0161955 A1 | 6/2011 | Woller |
| 2011/0167495 A1 | 7/2011 | Antonakakis |
| 2011/0173698 A1 | 7/2011 | Polyakov |
| 2011/0185425 A1 | 7/2011 | Lee |
| 2011/0208714 A1 | 8/2011 | Soukal |
| 2011/0239299 A1 | 9/2011 | Chen |
| 2011/0252474 A1 | 10/2011 | Ward |
| 2011/0271342 A1 | 11/2011 | Chung |
| 2011/0276695 A1 | 11/2011 | Maldaner |
| 2011/0283360 A1 | 11/2011 | Abadi |
| 2011/0296412 A1 | 12/2011 | Banga |
| 2011/0296486 A1 | 12/2011 | Burch |
| 2012/0042381 A1 | 2/2012 | Antonakakis |
| 2012/0054869 A1 | 3/2012 | Yen |
| 2012/0079596 A1* | 3/2012 | Thomas ............... G06F 21/565 726/24 |
| 2012/0084860 A1 | 4/2012 | Cao |
| 2012/0089700 A1 | 4/2012 | Safruti |
| 2012/0096549 A1 | 4/2012 | Amini |
| 2012/0110174 A1 | 5/2012 | Wootton |
| 2012/0117650 A1 | 5/2012 | Nachenberg |
| 2012/0117652 A1 | 5/2012 | Manni |
| 2012/0192274 A1 | 7/2012 | Odom |
| 2012/0233691 A1 | 9/2012 | Jiang |
| 2012/0240183 A1 | 9/2012 | Sinha |
| 2012/0240224 A1 | 9/2012 | Payne |
| 2012/0255018 A1 | 10/2012 | Sallam |
| 2012/0255019 A1 | 10/2012 | Mcnamee |
| 2012/0255021 A1 | 10/2012 | Sallam |
| 2012/0255031 A1 | 10/2012 | Sallam |
| 2012/0278889 A1 | 11/2012 | El-Moussa |
| 2012/0291042 A1 | 11/2012 | Stubbs |
| 2012/0291131 A1 | 11/2012 | Turkulainen |
| 2013/0007245 A1 | 1/2013 | Malik |
| 2013/0014259 A1 | 1/2013 | Gribble |
| 2013/0047147 A1 | 2/2013 | Mcneill |
| 2013/0055394 A1 | 2/2013 | Beresnevichiene |
| 2013/0091350 A1 | 4/2013 | Gluck |
| 2013/0091570 A1 | 4/2013 | Mccorkendale |
| 2013/0091571 A1 | 4/2013 | Lu |
| 2013/0104230 A1 | 4/2013 | Tang |
| 2013/0117848 A1 | 5/2013 | Golshan |
| 2013/0117852 A1 | 5/2013 | Stute |
| 2013/0122861 A1 | 5/2013 | Kim |
| 2013/0145002 A1 | 6/2013 | Kannan |
| 2013/0145008 A1 | 6/2013 | Kannan |
| 2013/0152200 A1 | 6/2013 | Alme |
| 2013/0160130 A1 | 6/2013 | Mendelev |
| 2013/0191915 A1 | 7/2013 | Antonakakis |
| 2013/0212684 A1 | 8/2013 | Li |
| 2013/0227165 A1 | 8/2013 | Liu |
| 2013/0232574 A1 | 9/2013 | Carothers |
| 2013/0246685 A1 | 9/2013 | Bhargava |
| 2013/0298184 A1 | 11/2013 | Ermagan |
| 2013/0298192 A1 | 11/2013 | Kumar |
| 2013/0298230 A1 | 11/2013 | Kumar |
| 2013/0298242 A1 | 11/2013 | Kumar |
| 2013/0298243 A1 | 11/2013 | Kumar |
| 2013/0298244 A1 | 11/2013 | Kumar |
| 2013/0326625 A1 | 12/2013 | Anderson |
| 2013/0347094 A1 | 12/2013 | Bettini |
| 2014/0006734 A1 | 1/2014 | Li |
| 2014/0059641 A1 | 2/2014 | Chapman, II |
| 2014/0096131 A1 | 4/2014 | Sonnek |
| 2014/0130158 A1 | 5/2014 | Wang |
| 2014/0189862 A1 | 7/2014 | Kruglick |
| 2014/0283037 A1 | 9/2014 | Sikorski |
| 2014/0337836 A1 | 11/2014 | Ismael |
| 2014/0351935 A1 | 11/2014 | Shao |
| 2014/0380474 A1 | 12/2014 | Paithane |
| 2015/0047033 A1 | 2/2015 | Thomas |
| 2015/0058984 A1 | 2/2015 | Shen |
| 2015/0067673 A1 | 3/2015 | Wang |
| 2015/0067862 A1 | 3/2015 | Yu |
| 2015/0074810 A1 | 3/2015 | Saher |
| 2015/0086115 A1* | 3/2015 | Danko ............... G06K 9/6217 382/190 |
| 2015/0096025 A1 | 4/2015 | Ismael |
| 2015/0195299 A1 | 7/2015 | Zoldi |
| 2015/0199207 A1 | 7/2015 | Lin |
| 2015/0278853 A1* | 10/2015 | McLaughlin ...... G06Q 30/0248 705/14.47 |
| 2016/0036836 A1 | 2/2016 | Grill |
| 2016/0099951 A1 | 4/2016 | Kashyap |
| 2016/0342787 A1 | 11/2016 | Wang |
| 2017/0093910 A1 | 3/2017 | Gukal |
| 2017/0322637 A1* | 11/2017 | Cheng ............... G06F 11/3688 |
| 2017/0323102 A1 | 11/2017 | Manadhata |
| 2018/0121659 A1 | 5/2018 | Sawhney |
| 2020/0019424 A1 | 1/2020 | Wang |
| 2020/0244678 A1 | 7/2020 | Shua |
| 2020/0358819 A1* | 11/2020 | Bowditch ............ G06K 9/6267 |
| 2020/0394299 A1 | 12/2020 | Urias |
| 2022/0129355 A1 | 4/2022 | Botelho |
| 2022/0269796 A1 | 8/2022 | Chase |

FOREIGN PATENT DOCUMENTS

| | | |
|---|---|---|
| WO | 2013067508 | 5/2013 |
| WO | 2013134206 | 9/2013 |

OTHER PUBLICATIONS

Author Unknown, Advanced Persistent Threats (APT), What's an Apt? A Brief Definition, Damballa, Dec. 14, 2010.

Author Unknown, Anatomy of a Targeted Attack, Damballa, Dec. 3, 2008.

Author Unknown, AV, IDS/IPS and Damballa's Response to Targeted Attacks, A Technology Comparison, Damballa, Nov. 2008.

Author Unknown, Closed Window, How Failsafe Enhancements Dramatically Limit Opportunities for Malware Armies and other Targeted Attacks, Damballa, Sep. 23, 2009.

Author Unknown, Damballa: A Different Approach, Targeted Attacks Requires a New Solution, Damballa, Sep. 23, 2008.

Author Unknown, Damballa's In-The-Cloud Security Model, Enterprise Protection Moves Beyond the Network Perimeter, Damballa, Aug. 24, 2008.

Author Unknown, Executive Overview, The Command Structure of the Aurora Botnet, Damballa, Mar. 2010.

Author Unknown, FireEye Malware Analysis, FireEye.com, FireEye, Inc., 2010.

Author Unknown, How to Be a Hero in the War Against BotArmies, Damballa, 2008.

Author Unknown, 'Hybrid Sandboxing for Detecting and Analyzing Advanced and Unknown Malware', Blue Coat Systems, Inc., Nov. 2013.

Author Unknown, Layer 8, How and Why Targeted Attacks Exploit Your Users, Damballa, Nov. 2011.

Author Unknown, 'Multi-Vector Virtual Execution (MVX) Engine', FireEye, Inc., http://www.fireeye.com/products-and-solutions/virtual-execution-engine.html, Jun. 2014.

Author Unknown, Targeted Attacks for Fun and Profit, An Executed Guide to a New and Growing Enterprise Threat, Damballa, Oct. 13, 2008.

Author Unknown, Trust Betrayed, What to Do When a Targeted Attack Turns Your Networks Against You, Damballa, Feb. 22, 2008.

Author Unknown, Updated on the Enemy, A Deconstruction of Who Profits From Botnets, Damballa, May 13, 2009.

Barr, The VMware Mobile Virtualization Platform: Is that a Hypervisor in your Pocket?, Dec. 2010, VMware, p. 124-135.

Binkley et al., An Algorithm for Anomaly-based Botnet Detection, Jul. 2006.

(56) References Cited

OTHER PUBLICATIONS

Blasing et al., An Android Application Sandbox System for Suspicious Software Detection, Malicious and Unwanted Software (MALWARE), 2010 5th International Conferences on IEEE, 2010.
Chen et al., Chapter 4: Guarding Against Network Intrusions, Network and System Security, Elsevier Inc., Feb. 2009, 5 pages.
Chen et al., Software-Defined Mobile Networks Security, Mobile Netw Appl, (2016), 21:729-743, Jan. 9, 2016.
Davidoff et al., 'Chapter 12: Malware Forensics,' Network Forensics: Tracking Hackers Through Cyberspace, Pearson Education Inc., Jun. 2012, 60 pages.
Dittrich et al., P2P as Botnet Command and Control; A Deeper Insight, 2008 3rd International Conference on Malicious and Unwanted Software (MALWARE), Oct. 2008, IEEE, vol. 10, pp. 41-48.
Giroire et al., Exploiting Temporal Persistence to Detect Convert Botnet Channels, Sep. 2009.
Goebel et al., Rishi: Identify Bot Contaminated Hosts by IRC Nickname Evaluation, Apr. 2007.
Gu et al., BotHunter: Detecting Malware Infection Through IDS-Driven Dialog Correlation, Aug. 2007.
Gu et al., BotMiner: Clustering Analysis of Network Traffic for Protocol- and Structure-Independent Botnet Detection, Jul. 2008.
Gu et al., BotSniffer: Detecting Botnet Command and Control Channels in Network Traffic, Feb. 2008.
Gunter Ollmann, Botnet Communication Topologies, Understanding the Intricacies of Bonet Command and Control, Damballa, Jun. 2009.
Gunter Ollmann, Extracting CnC from Malware, The Role of malware Sample Analysis in Botnet Detection, Damballa, Dec. 8, 2009.
Gunter Ollmann, Serial Variant Evasion Tactics, Techniques Used to Automatically Bypass Antivirus Technologies, Damballa, Oct. 7, 2009.
Gunter Ollmann, The Botnet vs. Malware Relationship, The One to one Botnet Myth, Damballa, Jun. 2009.
Gunter Ollmann, The Opt-IN Botnet Generation, Hacktivism and Centrally Controlled Protesting, Social Networks, Damballa, Apr. 26, 2010.
Karagiannis et al., BLINC: Multilevel Traffic Classification in the Dark, ACM SIGCOMM Computer Communication Review, Retrieved From https://www.microsoft.com/en-US/research/wp-content/uploads/2016/02/BLINC_TR.pdf, published 2005.
Karasaridis, Anestis et al., Wide-scale Botnet Detection and Characterization, Dec. 14, 2010.
Landecki, Grzegorz, Detecting Botnets, Linux Journal, Jan. 1, 2009.
Lau et al., 'Measuring Virtual Machine Detection in Malware using DSD Tracer', Sophoslabs, Journal in Computer Virology, Aug. 2008.
Li et al., "DroidBot: A Lightweight UI-Guided Test Input Generator for Android", 2017.
Ligh et al., 'Chapter 5: Researching Domains and IP Addresses,' Malware Analyst's Cookbook, John Wiley & Sons, Nov. 2010, 38 pages.
Lindorfer et al., 'Detecting Enviroment-Sensitive Malware', Recent Advances in Intrusion Detection. Springer Berlin Heidelberg, Jan. 2011.
Liu et al., An Automatic UI Interaction Script Generator for Android Applications Using Activity Call Graph Analysis. EURASIA Journal of Mathematics, Science and Technology Education, 14(7), 3159-3179. 2018.
Livadas et al., Using Machine Learning Techniques to Identify Botnet Traffic, BBN Technologies, Nov. 2006.
Min et al., Runtime-Based Behavior Dynamic Analysis System for Android Malware Detection, Atlantis Press, ICCIA 2012, Dec. 2012.
Nazario et al., As the Net Churns: Fast-Flux Botnet Observations, IEEE, pp. 24-31, Sep. 5, 2008.
Paul Royal, Analysis of the Kraken Botnet, Damballa, Apr. 9, 2008.
Rajab et al., 'A Multifaceted Approach to Understanding the Botnet Phenonmenon,' Proceedings of the 6th ACM SIGCOMM Conference on Internet Measurement, Oct. 2006, 12 pages.
Ramachandran, Anirudh et al., Revealing Botnet Membership Using DNSBL Counter-Intelligence, Jul. 7, 2006.
Rastogi et al., AppsPlayground: Automatic Security Analysis of Smartphone Applications, ACM, Feb. 2013.
Russ White, 'High Availability in Routing', Mar. 2004, Cisco Systems, vol. 7, Issue 1, pp. 2-14.
Schechter et al., 'Fast Detection of Scanning Worm Infections,' Recent Advances in Intrusion Detection: 7th International Symposium RAID 2004 Proceedings, Jan. 2004, 24 pages.
Shabtai et al., Andromaly: A Behavioral Malware Detection Framework for Android Devices, J Intell Inf Syst (2012) 38:161-190, Springer, Jan. 6, 2011.
Sikorski et al., 'Chapter 14: Malware-Focused Network Signatures,' Practical Malware Anlaysis, No Starch Press, Feb. 2012, 13 pages.
Singh et al., 'Hot Knives Through Butter: Evading File-based Sandboxes', FireEye, Inc., Feb. 2014.
Spreitzenbarth et al., "Mobile-Sandbox: Having a Deeper Look into Android Applications", from Proceedings of the 28th Annual ACM Symposium on Applied Computing, pp. 1808-1815, Mar. 2013.
Strayer et al. Detecting Botnets with Tight Command and Control, BBN Technologies, 2006.
Sun et al., Malware Virtualization-resitant behavior detection, 2011 IEEE, pp. 912-917.
Sylve et al., "Acquisition and analysis of volatile memory from android devices." Digital Investigation 8.3-4, pp. 175-184. 2012.
Van Der Heide et al., 'DNS Anomaly Detection,' System and Network Engineering Research Group, University of Amsterdam, Feb. 6, 2011, 20 pages.
Wagener et al., 'An Instrumented Analysis of Unknown Software and Malware Driven by Free Libre Open Source Software', Signal Image Technology and Internet Based Systems, 2008. SITIS'08. IEEE International Conference on. IEEE, Nov. 2008.
Yadav et al., Detecting Algorithmically Generated Domain-Flux Attacks with DNS Traffic Analysis, 2012, pp. 1-15.
Yadav et al., 'Detecting Algorithmically Generated Malicious Domain Names', Nov. 2010.
Yen, Ting-Fang et al., Traffic Aggregation for Malware Detection, Jul. 2008.
Yin et al., Panorama: Capturing System-Wide Information Flow for Malware Detection and Analysis, CCS'07 Oct. 29-Nov. 2, 2007, ACM, pp. 116-127.
Zang et al., Botnet Detection Through Fine Flow Classification, CSE Dept., Technical Report No. CSE11-001, p. 1-17, Jan. 31, 2011.
Zheng et al., "SmartDroid: an Automatic System for Revealing UI-based Trigger Conditions in Android Applications", Oct. 19, 2012.
Zhou et al., Dissecting Android Malware: Characterization and Evolution, IEEE, 2012.
Zou et al., Detecting Malware Based on DNS Graph Mining, Hindawi Publishing Corporation, International Journal of Distributed Sensor Networks, vol. 2015, pp. 1-12, Apr. 17, 2015.

\* cited by examiner

```
def take_screenshot(logger, vm, max_exec):
    # burn some initial time
    time.sleep(30)
    start = datetime.now()
    step = 0
    while True:
        time.sleep(1)
        print "Trying to capture a screenshot"
        try:
            result = vm.GetFrameBuffer()
            # logger.info("Captured in {}.seconds".format((datetime.now() - enter).total_seconds()))
            frame_buf, width, height, bpp = result
            logger.info("Saving raw file...")
            logger.info("Parsing frame buffer into PIL Image...")
            img = parse_frame_buffer(logger, frame_buf, width, height, bpp)
            return img
        except Exception, e:
            logger.info("Exception...")
            logger.info(e)
        if (datetime.now() - start).total_seconds() > max_exec:
            logger.info("Stopping now")
            vm.Stop()
            break
        step += 1
```

FIG. 8

```
def parse_frame_buffer(self, data, bpp):
    """ Parses frame buffer data to produce a Pillow/PIL Image :type data: Union[str, bytearray]
    :param data: Frame buffer bytes
    :type bpp: int
    :param bpp: Bits per pixel
    :rtype: Image.Image
    :return: Pillow/PIL Image
    """
    if bpp != 32:
        raise VMInterfaceError("Current code only supports 32 bits per pixel")
    width, height = self.resolution
    byte_vals = np.frombuffer(data, dtype=np.uint8, count=width * height * (bpp / 8))
    byte_vals = np.delete(byte_vals, np.arange(3, byte_vals.size, 4))
    return Image.frombytes('RGB', (width, height), byte_vals, "raw", "BGR")
```

FIG. 9

```
def img_diff(old_img, new_img, option):
    #np_new_img = cv2.cvtColor(np.array(new_img), cv2.COLOR_RGB2BGR)
    old_img = cv2.imread(old_img)
    new_img = cv2.imread(new_img)
    gray_old = cv2.cvtColor(old_img, cv2.COLOR_BGR2GRAY)
    gray_new = cv2.cvtColor(new_img, cv2.COLOR_BGR2GRAY)
    (score, diff) = compare_ssim(gray_old, gray_new, full=True)
    diff = (diff *255).astype("uint8")
    thresh = cv2.threshold(diff, 0, 255,
        cv2.THRESH_BINARY_INV | cv2.THRESH_OTSU)[1]
    cnts = cv2.findContours(thresh.copy(), cv2.RETR_EXTERNAL,
        cv2.CHAIN_APPROX_SIMPLE)
    cnts = cnts[0] if imutils.is_cv2() else cnts[1]
    i = 0
    print len(cnts)
    for c in cnts:
        #print type(c)
        #print len(c)
        (x, y, w, h) = cv2.boundingRect(c)
        loc = [x, y]
        identity = check_diff(loc, option)
        print str(i)+" x["+str(x)+"]"+" y["+str(y)+"]"+"   "+str(identity)
        cv2.rectangle(old_img, (x, y), (x + w, y + h), (0, 0, 255), 2)
        cv2.rectangle(new_img, (x, y), (x + w, y + h), (0, 0, 255), 2)
        i+=1 cv2.imshow("Original", old_img)
    cv2.imshow("Modified", new_img)
    # cv2.imshow("Diff", diff)
    # cv2.imshow("Thresh", thresh)
    cv2.waitKey(0)

def check_diff(loc, option):
    x = loc[0]
    y = loc[1]

if x < 100 and y < 1000 and y > 80:
        return "desktop icon"
    if x < 100 and y < 80:
        return "recycle bin"
    if y > 860:
        if x >1360:
            return "clock"
        return "taskbar, not clock"
    #assuming full_window is True
    if option == "full_window":
        #print option
        if x > 140 and x < 300 and y > 110:
            return "filename, dbl click this"
    return "unknown"
```

FIG. 10

```
def dbl_click(vm, logger, coords):
    x = coords[0]
    y = coords[1]
    logger.info("Location to DBL_CLICK " + str(x) +", "+str(y))
    vm.MoveMouse(1, x, y)
    vm.MoveMouse(0, x, y)
    vm.MoveMouse(1, x, y)
    vm.MoveMouse(0, x, y)
    time.sleep(15)
    time.sleep(20)
    return "done"
```

FIG. 11

1200 ⟶
```
def find_icon(logger, base, screenshot):
    #img1 = cwd+'/empty_desktop.png'
    #img2 = cwd+'/withicon.png'
    logger.info("Looking for a new Icon...")
    # image1 = Image.open(img1)
    # image2 = Image.open(img2)

imageA = cv2.imread(base)
    # imageB = cv2.imread(screenshot)
    imageB = cv2.cvtColor(np.array(screenshot), cv2.COLOR_RGB2BGR)

grayA = cv2.cvtColor(imageA, cv2.COLOR_BGR2GRAY)
    grayB = cv2.cvtColor(imageB, cv2.COLOR_BGR2GRAY)

# compute the Structural Similarity Index (SSIM) between the two
    # images, ensuring that the difference image is returned
    (score, diff) = compare_ssim(grayA, grayB, full=True)
    # score contains the SSIM, between (-1,1), 1 is a perfect match
    # diff contains the actual image differences between the two input images
    diff = (diff * 255).astype("uint8")
    # print("SSIM: {}".format(score))

# threshold the difference image, followed by finding contours to
    # obtain the regions of the two input images that differ
    thresh = cv2.threshold(diff, 0, 255,
        cv2.THRESH_BINARY_INV | cv2.THRESH_OTSU)[1]
    cnts = cv2.findContours(thresh.copy(), cv2.RETR_EXTERNAL,
        cv2.CHAIN_APPROX_SIMPLE)
    cnts = cnts[0] if imutils.is_cv2() else cnts[1]
    # loop over the contours
    f_x = 1000
    f_y = 1000
    f_w = 0
    f_h = 0
    for c in cnts:

# compute the bounding box of the contour and then draw the
        # bounding box on both input images to represent where the two
        # images differ
        (x, y, w, h) = cv2.boundingRect(c)
        if x > 100:
            continue if y < f_y:
            f_x = x
            f_y = y
            f_h = h
            f_w = w cv2.rectangle(imageA, (x, y), (x + w, y + h), (0, 0, 255), 2)
        # cv2.rectangle(imageB, (x, y), (x + w, y + h), (0, 0, 255), 2)

center_x = f_x + f_w/2
    center_y = f_y + f_h/2
    print center_x, center_y
    icon_coords = (center_x, center_y)
    return icon_coords show the output images
    # cv2.imshow("Original", imageA)
    # cv2.imshow("Modified", imageB)
    # cv2.imshow("Diff", diff)
    # cv2.imshow("Thresh", thresh)
    # cv2.waitKey(0)
```

FIG. 12

```
def find_image(self, image, threshold=0.80):
    """Locates an image in the current display contents :type threshold: float
    :param threshold: Minimum similarity score (0.0 to 1.0)
    :type image: Image.Image
    :param image: Image to be found
    :rtype: Point | None
    :return: Point or None
    """
    screenshot = self.get_image()
    img_rgb = cv2.cvtColor(np.array(screenshot), cv2.COLOR_RGB2BGR)
    img_gray = cv2.cvtColor(img_rgb, cv2.COLOR_BGR2GRAY)
    template = cv2.imread(image, 0)
    res = cv2.matchTemplate(img_gray, template, cv2.TM_CCOEFF_NORMED)
    (_, maxVal, _, maxLoc) = cv2.minMaxLoc(res)
    self.log.debug("max val is: {}".format(maxVal))
    if maxVal >= threshold:
        location_list = list(maxLoc)
        return Point(location_list[0], location_list[1])
    return None
```

```
def click_start(vm, logger, start_source, screen_img):
    threshold = .95
    location = findImage(screen_img, start_source, threshold)
    if location:
        logger.info("Location " + str(location))
        new1 = location[0]+10
        new2 = location[1]+10
        vm.MoveMouse(0, new1, new2)
        time.sleep(5)
        logger.info("Click attempt buttonmask 1")
        vm.MoveMouse(1, new1, new2)
        time.sleep(5)
        logger.info("Click attempt buttonmask 2")
        vm.MoveMouse(2, new1, new2)
        return "Found"

else:
        return "Not Found"
```

FIG. 14

Take screenshot of desktop after execution ⌒1502

Attempt to identify a common installer message box ⌒1504

If installer found: ⌒1506
    Search for radio buttons
    If radio button found:
        OCR text surrounding radio button
        If text contains NOT:
            Skip radio button
            Click alternative radio button
            BREAK
        BREAK Repeat...

FIG. 15

```
Take a screenshot of the desktop after execution   ⌐1602
                                          ⌐1604
Check for known warnings (enable macros)

If warning found:
        Search for enable/disable buttons
        If enable found:     ⌐1606
            Click button
            BREAK
        BREAK                                      ⌐1608
    Search for down arrow button in Word document
        If down arrow found:
            Repeatedly click the down arrow
            BREAK
```

FIG. 16

```
Take a screenshot of the desktop after execution  ─1702
Check for worksheet tab separators  ─1704
    If worksheet separators are found:  ─1706
        Click on each identified worksheet tab  ─1708
        BREAK
```

FIG. 17

```
Take a screenshot of the desktop after execution  ⌒1802
Search screenshot image for the browser icon  ⌒1804

If browser icon found:
    Click browser icon  ⌒1806
    Take updated screenshot  ⌒1808
    Search screenshot for URL bar  ⌒1810
    If URL bar is found:  ⌒1812
        Click URL bar
        Click keys to spell a URL  ⌒1814
        Click enter
    BREAK
```

FIG. 18

```
Take a screenshot of the desktop after execution ⟵1902

Search the screenshot for the Start button
    If start button found:         ⟵1904
        Click start button
        Take updated screenshot    ⟵1906
        Search the screenshot for "Shutdown"
        If "Shutdown" found:  ⟵1908
            Click Shutdown.
            Take updated screenshot  ⟵1910
            Search the screenshot for the type of shutdown
            If "Restart" found:
                Click "Restart"  ⟵1912
```

FIG. 19

SIMULATING USER INTERACTIONS FOR MALWARE ANALYSIS

CROSS REFERENCE TO OTHER APPLICATIONS

This application is a continuation of U.S. patent application Ser. No. 16/570,851 entitled SIMULATING USER INTERACTIONS FOR MALWARE ANALYSIS filed Sep. 13, 2019 which is incorporated herein by reference for all purposes.

BACKGROUND OF THE INVENTION

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

BRIEF DESCRIPTION OF THE DRAWINGS

Various embodiments of the invention are disclosed in the following detailed description and the accompanying drawings.

FIG. 8 illustrates example python code for taking a screenshot using a hypervisor.

FIG. 9 illustrates example python code for producing an image out of video card frame buffer data.

FIG. 10 illustrates example python code for performing differential image analysis.

FIG. 11 illustrates example python code for performing a double click by a hypervisor.

FIG. 12 illustrates example python code for locating a particular icon on a desktop.

FIG. 13 illustrates example python code for locating a particular image.

FIG. 14 illustrates example python code for clicking on a start button.

FIG. 15 illustrates example pseudocode for handling interactive installation dialogues.

FIG. 16 illustrates example pseudocode for handling documents.

FIG. 17 illustrates example pseudocode for handling spreadsheets.

FIG. 18 illustrates example pseudocode for launching a browser and visiting a site.

FIG. 19 illustrates example pseudocode for triggering a reboot.

DETAILED DESCRIPTION

Figure 1:
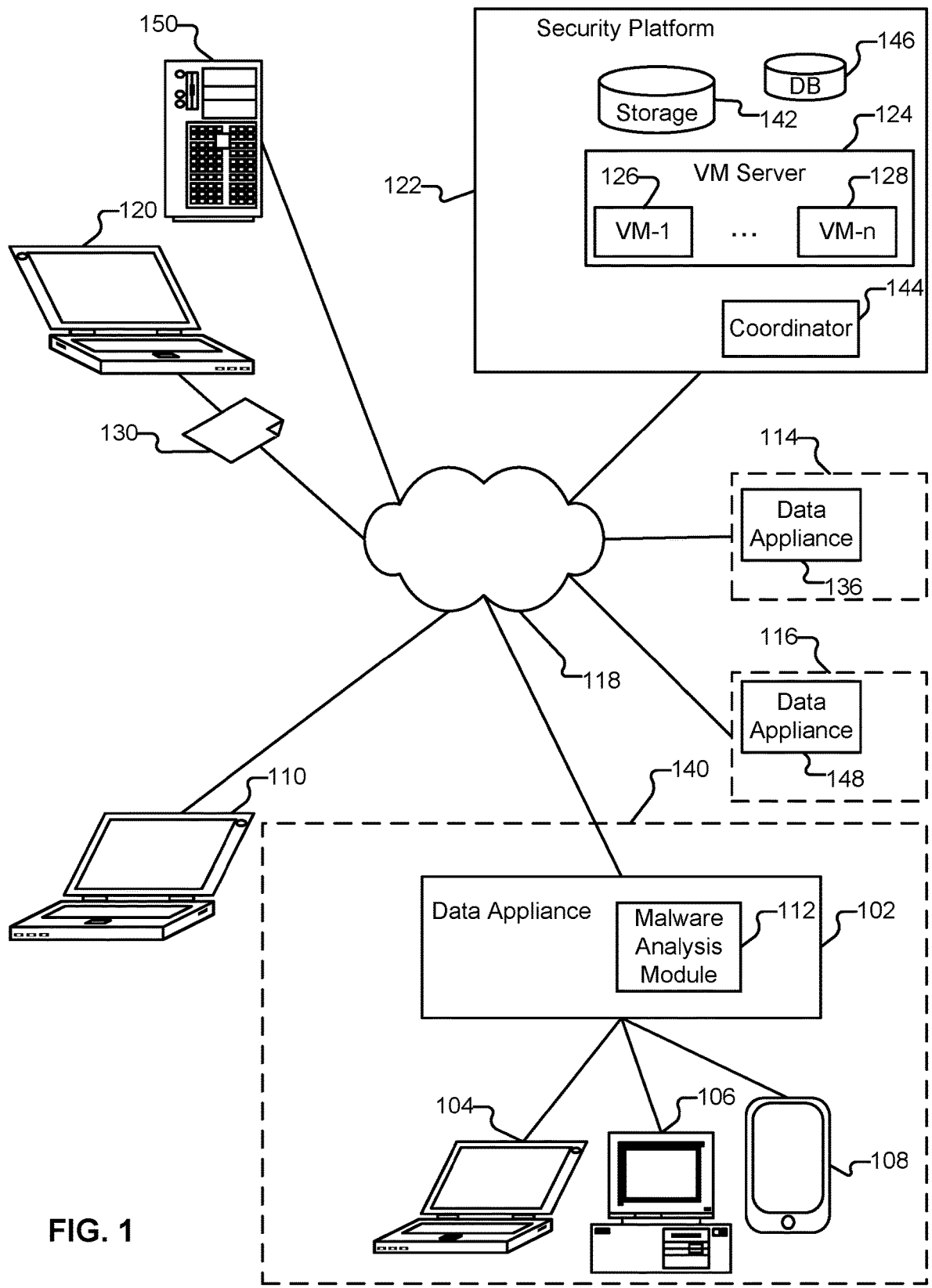
FIG. 1 illustrates an example of an environment in which malicious applications are detected and prevented from causing harm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Overview

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™ Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

II. Example Environment

FIG. 1 illustrates an example of an environment in which malicious applications ("malware") are detected and prevented from causing harm. As will be described in more detail below, malware classifications (e.g., as made by security platform 122) can be variously shared and/or refined among various entities included in the environment shown in FIG. 1. And, using techniques described herein, devices, such as endpoint client devices 104-110 can be protected from such malware.

The term "application" is used throughout the Specification to collectively refer to programs, bundles of programs, manifests, packages, etc., irrespective of form/platform. An "application" (also referred to herein as a "sample") can be a standalone file (e.g., a calculator application having the filename "calculator.apk" or "calculator.exe") and can also be an independent component of another application (e.g., a mobile advertisement SDK or library embedded within the calculator app).

"Malware" as used herein refers to an application that engages in behaviors, whether clandestinely or not (and whether illegal or not), of which a user does not approve/would not approve if fully informed. Examples of malware include Trojans, viruses, rootkits, spyware, hacking tools, keyloggers, etc. One example of malware is a desktop application that collects and reports to a remote server the end user's location (but does not provide the user with location-based services, such as a mapping service). Another example of malware is a malicious Android Application Package .apk (APK) file that appears to an end user to be a free game, but stealthily sends SMS premium messages (e.g., costing $10 each), running up the end user's phone bill. Another example of malware is an Apple iOS flashlight application that stealthily collects the user's contacts and sends those contacts to a spammer. Other forms of malware can also be detected/thwarted using the techniques described herein (e.g., ransomware).

Techniques described herein can be used in conjunction with a variety of platforms (e.g., desktops, mobile devices, gaming platforms, embedded systems, etc.) and/or a variety of types of applications across a variety of CPU architectures (e.g., Android .apk files, iOS applications, Windows PE files, Adobe Acrobat PDF files, etc.). In the example environment shown in FIG. 1, client devices 104-108 are a laptop computer, a desktop computer, and a tablet (respectively) present in an enterprise network 140. Client device 110 is a laptop computer present outside of enterprise network 140.

Data appliance 102 is configured to enforce policies regarding communications between client devices, such as client devices 104 and 106, and nodes outside of enterprise network 140 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 140.

Figure 2A:
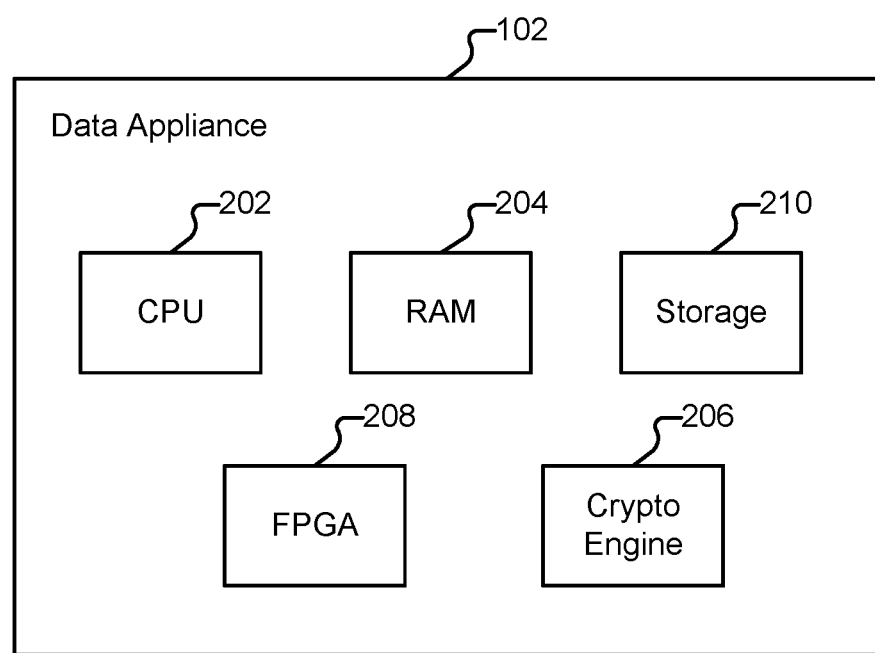
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 140 and implementing disclosed techniques. Examples of such information include application identifiers, content identifiers, user identifiers, requested URLs, IP address mappings, policy and other configuration information, signatures, hostname/URL categorization information, malware profiles, and machine learning models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 110) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

Figure 2B:
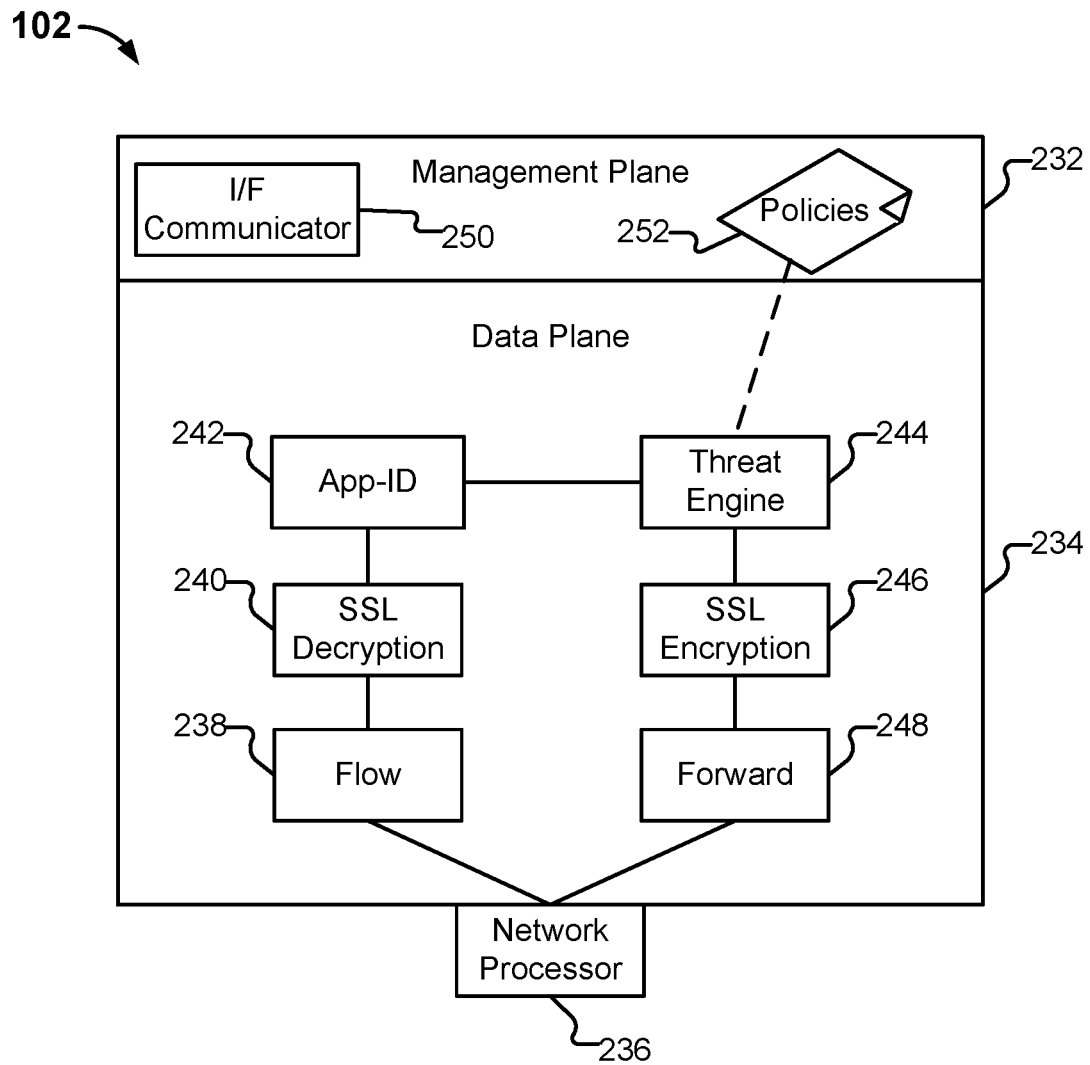
FIG. 2B is a functional diagram of logical components in an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, e.g., a web browsing session, the identified application can change, and such changes will be noted by data appliance 102. For example a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 250 is provided for management communications (e.g., via (REST) APIs, messages, or network protocol communications or other communication mechanisms).

III. Security Platform

Returning to FIG. 1, suppose a malicious individual (using system 120) has created malware 130. The malicious individual hopes that a client device, such as client device 104, will execute a copy of malware 130, compromising the client device, and, e.g., causing the client device to become a bot in a botnet. The compromised client device can then be instructed to perform tasks (e.g., cryptocurrency mining, or participating in denial of service attacks) and to report information to an external entity, such as command and control (C&C) server 150, as well as to receive instructions from C&C server 150, as applicable.

Suppose data appliance 102 has intercepted an email sent (e.g., by system 120) to a user, "Alice," who operates client device 104. A copy of malware 130 has been attached by system 120 to the message. As an alternate, but similar scenario, data appliance 102 could intercept an attempted download by client device 104 of malware 130 (e.g., from a website). In either scenario, data appliance 102 determines whether a signature for the file (e.g., the email attachment or website download of malware 130) is present on data appliance 102. A signature, if present, can indicate that a file is known to be safe (e.g., is whitelisted), and can also indicate that the file is known to be malicious (e.g., is blacklisted).

In various embodiments, data appliance 102 is configured to work in cooperation with security platform 122. As one example, security platform 122 can provide to data appliance 102 a set of signatures of known-malicious files (e.g., as part of a subscription). If a signature for malware 130 is included in the set (e.g., an MD5 hash of malware 130), data appliance 102 can prevent the transmission of malware 130 to client device 104 accordingly (e.g., by detecting that an MD5 hash of the email attachment sent to client device 104 matches the MD5 hash of malware 130). Security platform 122 can also provide to data appliance 102 a list of known malicious domains and/or IP addresses, allowing data appliance 102 to block traffic between enterprise network 140 and C&C server 150 (e.g., where C&C server 150 is known to be malicious). The list of malicious domains (and/or IP addresses) can also help data appliance 102 determine when one of its nodes has been compromised. For example, if client device 104 attempts to contact C&C server 150, such attempt is a strong indicator that client 104 has been compromised by malware (and remedial actions should be taken accordingly, such as quarantining client device 104 from communicating with other nodes within enterprise network 140).

A variety of actions can be taken by data appliance 102 if no signature for an attachment is found, in various embodiments. As a first example, data appliance 102 can fail-safe, by blocking transmission of any attachments not whitelisted as benign (e.g., not matching signatures of known good files). A drawback of this approach is that there may be many legitimate attachments unnecessarily blocked as potential malware when they are in fact benign. As a second example, data appliance 102 can fail-danger, by allowing transmission of any attachments not blacklisted as malicious (e.g., not matching signatures of known bad files). A drawback of this approach is that newly created malware (previously unseen by platform 122) will not be prevented from causing harm.

As a third example, data appliance 102 can be configured to provide the file (e.g., malware 130) to security platform 122 for static/dynamic analysis, to determine whether it is malicious and/or to otherwise classify it. A variety of actions can be taken by data appliance 102 while analysis by security platform 122 of the attachment (for which a signature is not already present) is performed. As a first example, data appliance 102 can prevent the email (and attachment) from being delivered to Alice until a response is received from security platform 122. Assuming platform 122 takes approximately 15 minutes to thoroughly analyze a sample, this means that the incoming message to Alice will be delayed by 15 minutes. Since, in this example, the attachment is malicious, such a delay will not impact Alice negatively. In an alternate example, suppose someone has sent Alice a time sensitive message with a benign attachment for which a signature is also not present. Delaying delivery of the message to Alice by 15 minutes will likely be viewed (e.g., by Alice) as unacceptable. An alternate approach is to perform at least some real-time analysis on the attachment on data appliance 102 (e.g., while awaiting a verdict from platform 122). If data appliance 102 can independently determine whether the attachment is malicious or benign, it can take an initial action (e.g., block or allow delivery to Alice), and can adjust/take additional actions once a verdict is received from security platform 122, as applicable.

Security platform 122 stores copies of received samples in storage 142 and analysis is commenced (or scheduled, as applicable). One example of storage 142 is an Apache Hadoop Cluster (HDFS). Results of analysis (and additional information pertaining to the applications) are stored in database 146. In the event an application is determined to be malicious, data appliances can be configured to automatically block the file download based on the analysis result. Further, a signature can be generated for the malware and distributed (e.g., to data appliances such as data appliances 102, 136, and 148) to automatically block future file transfer requests to download the file determined to be malicious.

In various embodiments, security platform 122 comprises one or more dedicated commercially available hardware servers (e.g., having multi-core processor(s), 32G+ of RAM, gigabit network interface adaptor(s), and hard drive(s))

running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, in various embodiments, security platform 122 performs static/dynamic analysis in cooperation with one or more virtual machine (VM) servers, such as VM server 124.

An example of a virtual machine server is a physical machine comprising commercially available server-class hardware (e.g., a multi-core processor, 32+ Gigabytes of RAM, and one or more Gigabit network interface adapters) that runs open source and/or commercially available virtualization software, such as Linux Kernel-based Virtual Machine (KVM), VMware ESXi, Citrix XenServer, and Microsoft Hyper-V. Custom virtualization software can also be use and/or the functionality of commercially available virtualization software extended as needed to support various functionality described herein (e.g., as being provided by a hypervisor). Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144.

In various embodiments, security platform 122 makes available results of its analysis of samples via a list of signatures (and/or other identifiers) to data appliance 102 as part of a subscription. For example, security platform 122 can periodically send a content package that identifies malware apps (e.g., daily, hourly, or some other interval, and/or based on an event configured by one or more policies). An example content package includes a listing of identified malware apps, with information such as a package name, a hash value for uniquely identifying the app, and a malware name (and/or malware family name) for each identified malware app. The subscription can cover the analysis of just those files intercepted by data appliance 102 and sent to security platform 122 by data appliance 102, and can also cover signatures of all malware known to security platform 122 (or subsets thereof, such as just mobile malware but not other forms of malware (e.g., PDF malware)).

In various embodiments, security platform 122 is configured to provide security services to a variety of entities in addition to (or, as applicable, instead of) an operator of data appliance 102. For example, other enterprises, having their own respective enterprise networks 114 and 116, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install software on client device 110 that communicates with security platform 122 (e.g., to receive content packages from security platform 122, use the received content packages to check attachments in accordance with techniques described herein, and transmit applications to security platform 122 for analysis).

IV. Analyzing Samples Using Static/Dynamic Analysis

Figure 3:
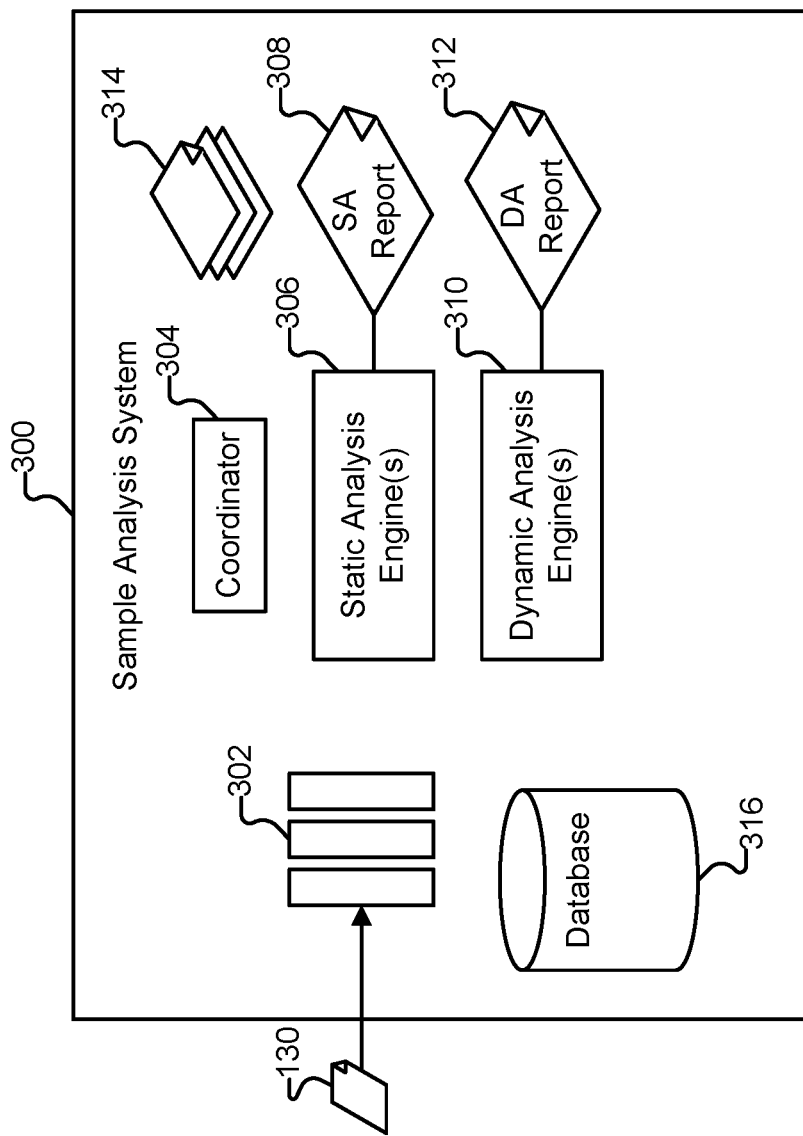
FIG. 3 illustrates an example of logical components that can be included in a system for analyzing samples.

FIG. 3 illustrates an example of logical components that can be included in a system for analyzing samples. Analysis system 300 can be implemented using a single device. For example, the functionality of analysis system 300 can be implemented in a malware analysis module 112 incorporated into data appliance 102. Analysis system 300 can also be implemented, collectively, across multiple distinct devices. For example, the functionality of analysis system 300 can be provided by security platform 122, or as a separate device located within network 140 and in communication with data appliance 102 (e.g., comprising various applicable components described herein as being provided by security platform 122, such as virtual machine server 124).

In various embodiments, analysis system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or security platform 122). Examples of information included in collection 314 are: URLs, domain names, and/or IP addresses of known malicious servers; URLs, domain names, and/or IP addresses of known safe servers; URLs, domain names, and/or IP addresses of known command and control (C&C) domains; signatures, hashes, and/or other identifiers of known malicious applications; signatures, hashes, and/or other identifiers of known safe applications; signatures, hashes, and/or other identifiers of known malicious files (e.g., Android exploit files); signatures, hashes, and/or other identifiers of known safe libraries; and signatures, hashes, and/or other identifiers of known malicious libraries.

A. Ingestion

In various embodiments, when a new sample is received for analysis (e.g., an existing signature associated with the sample is not present in analysis system 300), it is added to queue 302. As shown in FIG. 3, application 130 is received by system 300 and added to queue 302.

B. Static Analysis

Coordinator 304 monitors queue 302, and as resources (e.g., a static analysis worker) become available, coordinator 304 fetches a sample from queue 302 for processing (e.g., fetches a copy of malware 130). In particular, coordinator 304 first provides the sample to static analysis engine 306 for static analysis. In some embodiments, one or more static analysis engines are included within analysis system 300, where analysis system 300 is a single device. In other embodiments, static analysis is performed by a separate static analysis server that includes a plurality of workers (i.e., a plurality of instances of static analysis engine 306).

The static analysis engine obtains general information about the sample, and includes it (along with heuristic and other information, as applicable) in a static analysis report 308. The report can be created by the static analysis engine, or by coordinator 304 (or by another appropriate component) which can be configured to receive the information from static analysis engine 306. In some embodiments, the collected information is stored in a database record for the sample (e.g., in database 316), instead of or in addition to a separate static analysis report 308 being created (i.e., portions of the database record form the report 308). In some embodiments, the static analysis engine also forms a verdict with respect to the application (e.g., "safe," "suspicious," or "malicious"). As one example, the verdict can be "malicious" if even one "malicious" static feature is present in the application (e.g., the application includes a hard link to a known malicious domain). As another example, points can be assigned to each of the features (e.g., based on severity if found; based on how reliable the feature is for predicting malice; etc.) and a verdict can be assigned by static analysis engine 306 (or coordinator 304, if applicable) based on the number of points associated with the static analysis results.

C. Dynamic Analysis

Once static analysis is completed, coordinator 304 locates an available dynamic analysis engine 310 to perform dynamic analysis on the application. As with static analysis engine 306, analysis system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a virtual machine instance. In some embodiments, results of static analysis (e.g., performed by static analysis engine 306), whether in report form (308) and/or as stored in database 316, or otherwise stored, are provided as input to dynamic analysis engine 310. For example, the static analysis report information can be used to help select/customize/configure the virtual machine instance used by dynamic analysis engine 310 (e.g., Microsoft Windows 7 SP 2 vs. Microsoft Windows 10 Enterprise, or iOS 11.0 vs. iOS 12.0). Where multiple virtual machine instances are executed at the same time, a single dynamic analysis engine can manage all of the instances, or multiple dynamic analysis engines can be used (e.g., with each managing its own virtual machine instance), as applicable. As will be explained in more detail below, during the dynamic portion of the analysis, actions taken by the application (including network activity) are analyzed.

In various embodiments, static analysis of a sample is omitted or is performed by a separate entity, as applicable. As one example, traditional static and/or dynamic analysis may be performed on files by a first entity. Once it is determined (e.g., by the first entity) that a given file is malicious, the file can be provided to a second entity (e.g., the operator of security platform 122) specifically for additional analysis with respect to the malware's use of network activity (e.g., by a dynamic analysis engine 310).

The environment used by analysis system 300 is instrumented/hooked such that behaviors observed while the application is executing are logged as they occur (e.g., using a customized kernel that supports hooking and logcat). Network traffic associated with the emulator is also captured (e.g., using pcap). The log/network data can be stored as a temporary file on analysis system 300, and can also be stored more permanently (e.g., using HDFS or another appropriate storage technology or combinations of technology, such as MongoDB). The dynamic analysis engine (or another appropriate component) can compare the connections made by the sample to lists of domains, IP addresses, etc. (314) and determine whether the sample has communicated (or attempted to communicate) with malicious entities.

As with the static analysis engine, the dynamic analysis engine stores the results of its analysis in database 316 in the record associated with the application being tested (and/or includes the results in report 312 as applicable). In some embodiments, the dynamic analysis engine also forms a verdict with respect to the application (e.g., "safe," "suspicious," or "malicious"). As one example, the verdict can be "malicious" if even one "malicious" action is taken by the application (e.g., an attempt to contact a known malicious domain is made, or an attempt to exfiltrate sensitive information is observed). As another example, points can be assigned to actions taken (e.g., based on severity if found; based on how reliable the action is for predicting malice; etc.) and a verdict can be assigned by dynamic analysis engine 310 (or coordinator 304, if applicable) based on the number of points associated with the dynamic analysis results. In some embodiments, a final verdict associated with the sample is made based on a combination of report 308 and report 312 (e.g., by coordinator 304).

V. Simulating User Interactions for Malware Analysis

Malware authors are using increasingly sophisticated techniques when crafting their malware so that it evades detection by security analysis systems. One such technique is to have the malware attempt to determine whether it is executing in a virtual machine environment, and if so, to refrain from executing or otherwise not engage in malicious activities. By doing so, a security analysis system may erroneously conclude that the malware sample is benign because it is not observed by the security analysis system to engage in malicious behavior during dynamic analysis. As will be described in more detail below, in various embodiments, platform 122 and/or data appliance 102, or other component or components, as applicable, make use of techniques to help thwart detection by malware samples that they are being executed in virtualized environments. By preventing malware samples from determining that they are being executed in virtualized environments, successful detection of the samples as being malicious is more likely to occur as the malware samples will more likely engage in malicious behavior while being executed in the virtualized environment.

One way that malware can determine whether it is executing in a virtual machine environment is by looking for indicia that it is being manipulated/executed by the guest operating system. As an example, in a typical virtualized environment, a sample to be tested (e.g., sample 130) might be renamed (e.g., from its original name as observed by data appliance 102) to a default name, such as "sample.exe." A script (e.g., "autoexec.bat") will automatically be executed at startup by the guest operating system and directly launch or cause the launching of the sample (e.g., by a dynamic analysis helper tool). Since the malware sample and dynamic analysis help script/tools are all collocated within the user space of the guest OS, the presence of the dynamic analysis script/tools on the guest OS will be visible to the malware, as will information such as that the malware was started by the script (or tool) and/or that the malware has been renamed. Further, the dynamic analysis helper tool may make use of OS API calls (e.g., instructing the operating system to take various actions such as keyboard entry). Use of those API calls by the dynamic analysis helper tool can be observed by the malware. If the executing sample determines that it is being executed in a virtualized environment, it can refrain from engaging in malicious actions and evade being flagged a malicious by a dynamic analysis system.

Another way that malware can determine whether it is executing in a virtual machine environment is by looking for indicia that a human is interacting with the system on which the malware is executing. If a human does not appear to be interacting with the system, the malware may refrain from engaging in malicious actions. As one example, a malicious document may only engage in malicious behavior after a certain set of actions has been taken within the word processing application used to launch the malicious document (e.g., scrolling down four pages using a mouse, or performing a certain number of mouse clicks). As another example, a malicious spreadsheet comprising multiple worksheets may refrain from taking malicious actions until each worksheet has been clicked on with a mouse.

Some virtualized dynamic analysis environments may attempt to replicate user behavior through scripting/hooks (e.g., using guest OS API calls to press keyboard keys or move the position of the mouse). However, increasingly sophisticated malware is aware of when such OS API calls are used and can thus detect such interactions as being automatically generated by a dynamic analysis system instead of being made by a human end user. As such, malicious documents may require more complex indicia of human use that does not lend itself to scripting (e.g., scrolling down four pages using a mouse, performing a certain number of mouse clicks, etc.) before exhibiting malicious behavior.

A. Example Environment

Figure 4:
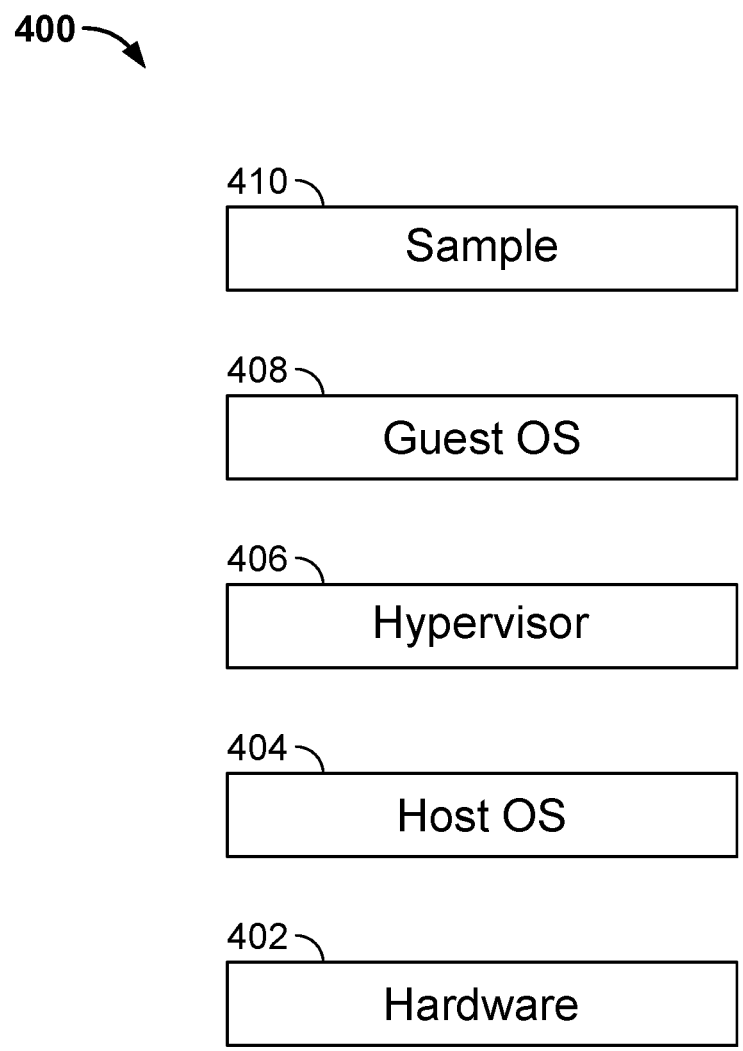
FIG. 4 illustrates an embodiment of an environment for analyzing malware samples.

FIG. 4 illustrates an embodiment of an environment for analyzing malware samples. Environment 400 is an example of components that can be included in system 300 (e.g., as dynamic analysis engine 310). In the example shown in FIG. 4, a dynamic analyzer host OS (404), such as Ubuntu for x86_64, runs on appropriate hardware (402), such as Intel x86 or x86_64 based hardware. A hypervisor (406) runs a virtual machine that has a guest OS (408) of a type appropriate for the sample being analyzed (e.g., 64-bit Windows 7 SP 2 or MacOS X) and, as applicable, various applications pre-installed (e.g., Microsoft Office, Adobe Acrobat, Mozilla Firefox, Safari, etc.).

As previously mentioned, when performing dynamic analysis in a virtualized environment, one approach is for sample 410 to be launched by a script or tool executing within guest OS 408. For example, a helper tool installed on guest OS 408 can rely on Windows APIs to detect message boxes and new items on the desktop, perform keyboard presses and movements, etc. However, as mentioned above, one drawback of this approach is that it can allow the malware to detect that it is executing in/manipulated by guest OS 408 and cause it to refrain from exhibiting malicious behaviors to evade detection.

An alternate approach (used by various embodiments of security platform 122, malware analysis module 112, sample analysis system 300, etc.) does not rely on the guest OS to simulate user actions, but instead uses hypervisor 406. In particular, and as will be described in more detail below, frame buffer data stored by the graphics card is directly accessed by the hypervisor to generate screenshots of the virtualized system's desktop for analysis, and device drivers such as the mouse device driver are hooked so that the hypervisor can move the virtualized mouse directly, as an end user would, without making guest OS API calls. Since guest OS API calls are not used to simulate human activity, the malware sample (410) will be unable to detect that it is running in a virtualized environment and thus will not conceal its malicious behavior during analysis.

B. Using the Hypervisor

Figure 5:
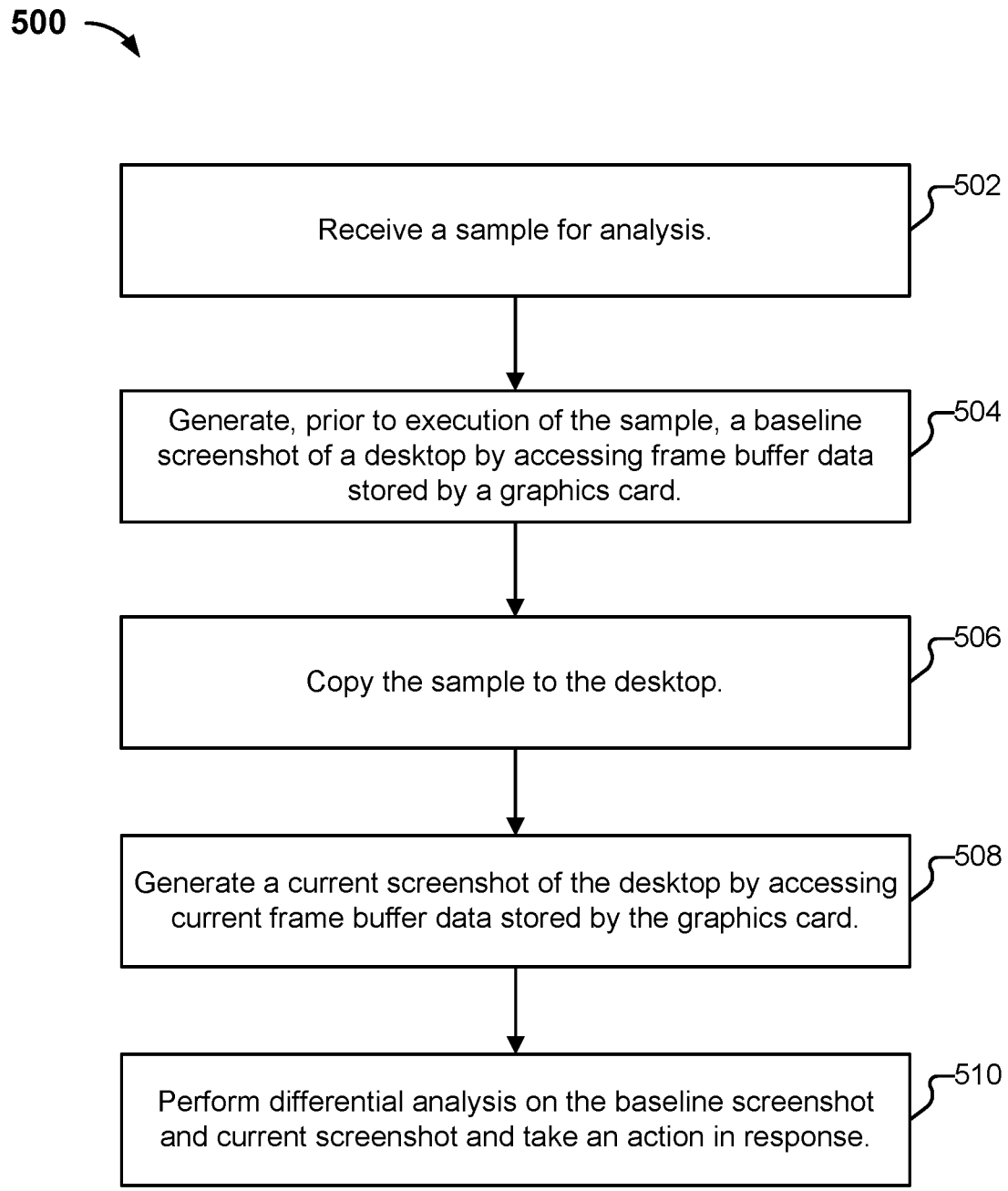
FIG. 5 illustrates an embodiment of a process for analyzing malware samples.

FIG. 5 illustrates an embodiment of a process for analyzing malware samples. In various embodiments, process 500 is performed using environment 400, which is configured to log behaviors/network traffic using techniques described above (e.g., in Section IV). The process begins at 502 when a sample is received for analysis. As one example, candidate malware is received at 502 by dynamic analysis engine 310 when dynamic analysis engine 310 is instructed to analyze the sample. Another example of receipt 502 occurs when an email (including an attachment) is received by data appliance 102 from system 120. As another example, data appliance 102 can be configured to transmit the attachment to security platform 122 for analysis. In that scenario, the candidate is received by security platform 122 at 502.

Figure 6:
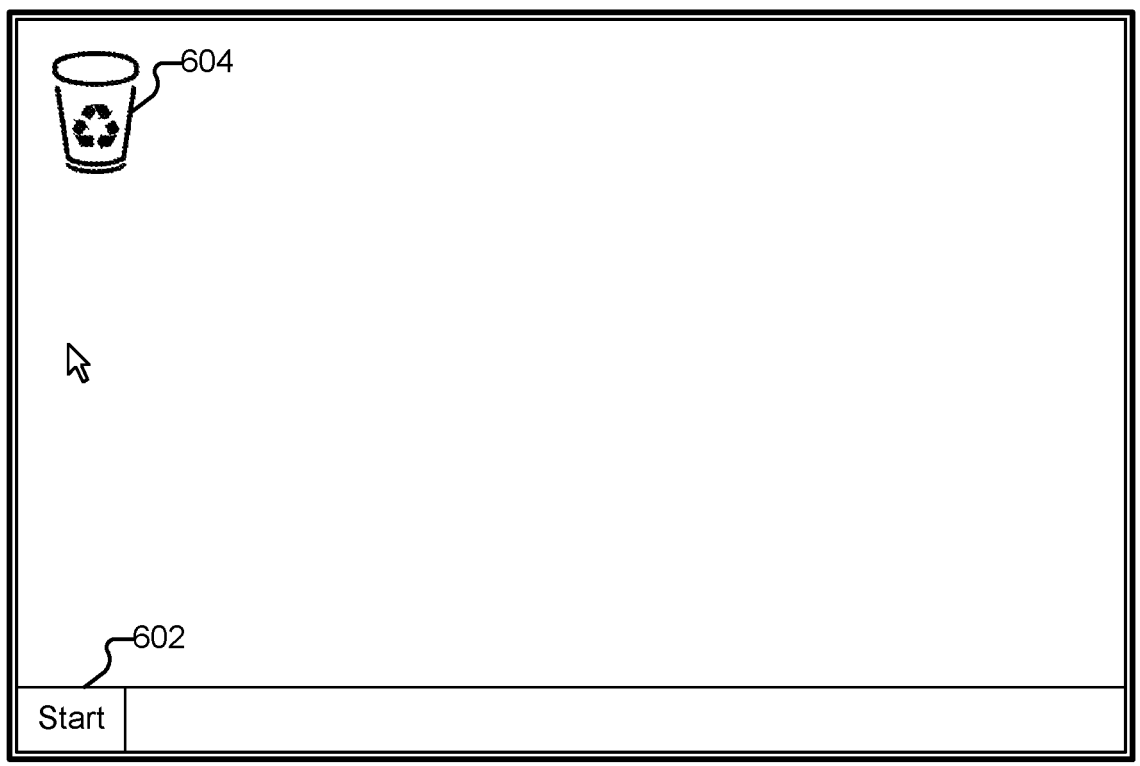
FIG. 6 illustrates an example of a baseline desktop screenshot.

At 504, and prior to execution of the sample received at 502, a baseline screenshot of a desktop is taken by accessing frame buffer data stored by a graphics card. An example of a baseline screenshot is depicted in FIG. 6. Baseline desktop screenshot 600 depicts a default Windows 7 desktop, and includes elements such as start button 602 and recycle bin 604. If other applications are installed in the virtualized environment (e.g., a web browser application, a productivity suite, etc.), such icons can also be optionally included in the baseline desktop, as applicable, as can other items such as download folders, toolbars, a system clock, etc. Baseline desktop screenshots of other desktops can also be taken (e.g., where other operating systems are being executed by environment 400, such as MacOS X).

Figure 7:
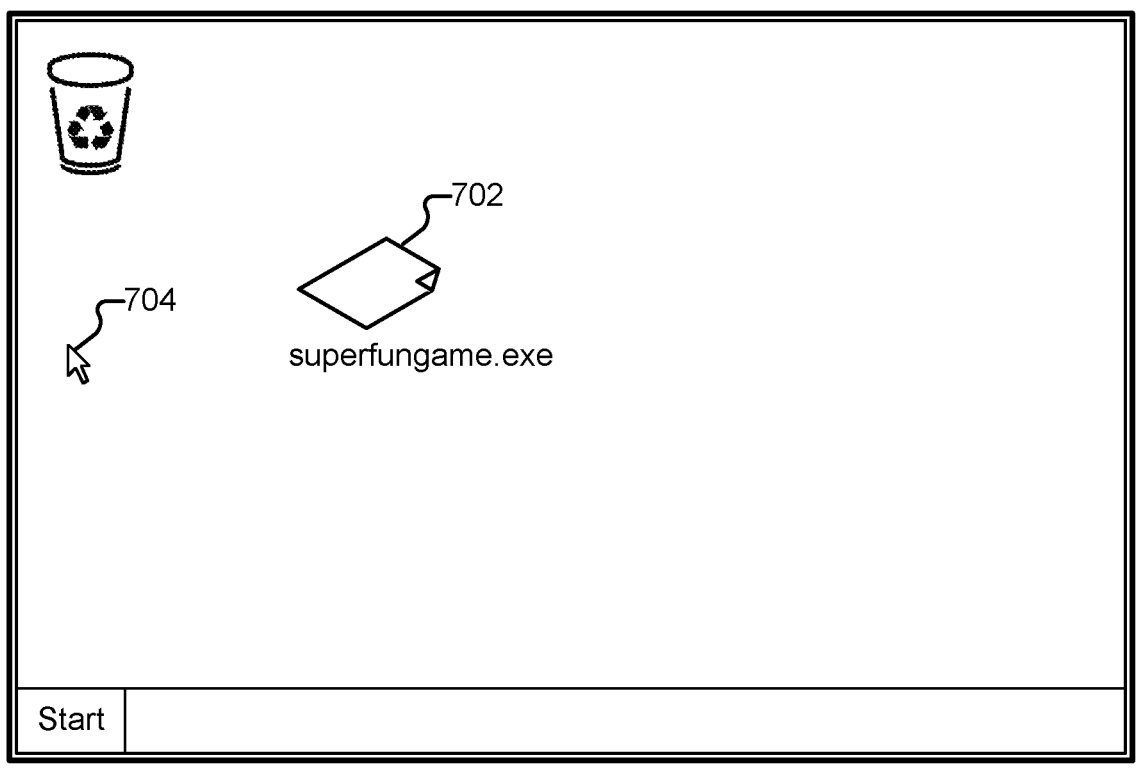
FIG. 7 illustrates an example of a desktop screenshot after a malware sample is placed on the desktop.

The baseline desktop screenshot can be taken at a variety of times. As one example, the baseline desktop screenshot can be taken each time process 500 starts (e.g., after a guest OS is booted). As another example, a baseline desktop screenshot can be created independently of analysis of a particular sample and stored (e.g., by sample analysis system 300) for repeated use by a single dynamic analysis engine or multiple dynamic analysis engines. Further, the baseline desktop screenshot can be taken prior to the sample being copied to the guest OS (e.g., as shown in FIG. 6) and can also be taken after the sample has been copied to the guest OS, but prior to execution of the sample. FIG. 7 illustrates an example of a desktop screenshot after a malware sample is placed on the desktop. Example python code for taking a screenshot using a hypervisor is shown in FIG. 8. The code can be used to scrape raw data from the hypervisor's virtual graphics card in order to programmatically piece together an image of what is currently displayed on the desktop (i.e., a screenshot). Example python code for producing an image out of video card frame buffer data is shown in FIG. 9. The code can be used to manipulate the pixels collected using embodiments of code illustrated in FIG. 8 and convert the stream of data into an image.

Returning to process 500, at 506, the sample is copied to the desktop. As an example, hypervisor 406 can copy sample 702 to the desktop after the guest OS has booted. As an alternate example, hypervisor 406 can include a path to sample 702 during an initialization step, can perform a copy-on-write using sample 702, etc., as applicable. Further, and as will be described in more detail below, in various embodiments, instead of placing sample 702 on the desktop, sample 702 is placed in another appropriate location such as a download directory at 506.

At 508, after sample 702 has been copied to the desktop, hypervisor 406 generates another screenshot of the desktop.

At 510, differential analysis is performed on the baseline desktop screenshot and the screenshot taken at 508. In doing so, a visual determination can be made that sample 702 has been added to the desktop and has a center point at particular coordinates (e.g., x=300, y=200). Example python code for performing differential image analysis on two images is shown in FIG. 10. An example of the first image is a picture of the original desktop before execution. An example of the second image is a picture of the desktop after the operating system has booted and the sample has been added to the desktop. In the example shown in FIG. 10, the screenshots are normalized by a greyscale conversion operation, and a Structural SIMilarity (SSIM) index is used to determine whether the two images are the same (e.g., based on a threshold). If the screenshots are determined to be different, one or more bounding boxes (contours) are created to identify the locations of the changed areas. This will allow hypervisor 406 to click on the changed areas (e.g., in the center of the identified bounding box). Certain regions of the desktop are handled specially, as certain changes to the desktop are expected to happen and need to be taken into account. The system clock, by default, is located in the bottom right corner of the screen on a Windows desktop, and will change time every minute. Another example is the recycle bin, which changes colors based on whether or not something has been added to the recycle bin. Such changes are taken into account in the script by identifying the range of pixels that these changes are likely to occur in and blacklisting them from being used during desktop image differential analysis.

One approach to causing the sample to be executed is for hypervisor 406 to use a mouse driver to move mouse pointer 704 to sample 702 (e.g., to pixel position 300,200) and then instruct the mouse driver to double click at that location, which will cause sample 702 to execute. Example python code for performing a double click by a hypervisor is shown in FIG. 11. The virtual hardware within the hypervisor is used to manipulate the location of the cursor on screen and click on the cursor. MoveMouse(1, x, y) is the click down and MoveMouse(1, x, y) is the release of the button. In order to double click a mouse at the hardware level, the mouse is clicked, released, clicked again, and released again.

Additional example python code, specifically for locating a particular icon in a screenshot, is shown in FIG. 12. Icons are also referred to herein as artifacts. Script 1200 uses an SSIM calculation to determine the location of a sample icon that was added to the desktop. Script 1200 can be useful, for example, when automating an action that requires clicking on a particular button, such as the start button, or determining whether a particular type of icon requiring a particular type of interaction is present on the screen (e.g., a browser application icon, or a document save icon). In particular, script 1200 can be used to find an icon on the desktop and return the center of that icon in order to provide a suitable location to double click for execution. Script 1200 works specifically on the region the desktop that is configured to have new icons added to it. As applicable, settings in the guest operating system (e.g., Windows) can be configured to lock images to certain regions of the desktop and to make sure they are aligned properly.

A set of common icons (e.g., applicable to the particular executing guest OS, such as Windows 7 or MacOS X) can be stored in a library or directory accessible to environment 400. In various embodiments, script 1200 is used in addition to/instead of differential analysis being performed. As an example, once a sample is executed, it may cause the launching of a web browser (or other application). Icons associated with such applications (e.g., tool bar icons) can be searched for (e.g., using script 1200) periodically and workflows applicable to those applications (e.g., navigating to a particular website by typing a URL in a URL bar) can be taken automatically in response.

The actions described thus far as being taken in embodiments of process 500 can be used to automate the execution of a malware sample without relying on the guest OS, and thus in a manner that is indistinguishable from an actual human having clicked on the sample. As will be described in more detail below, iterations of portions 508 and 510 can be performed throughout the duration of the dynamic analysis conducted by environment 400 to simulate additional user behaviors. Further, which user behaviors are simulated during dynamic analysis of a particular sample (e.g., based on filetype of the sample) can be scripted or otherwise customized (e.g., based on static analysis results), as will also be described in more detail below.

Example python code for performing two additional functions are depicted in FIGS. 13-14. Script 1300 can be used to locate the coordinates of a particular known image (e.g., passed in as input) in a screenshot using image recognition. In particular, script 1300 can be used to identify the location of an image on the entire screen and does not limit itself to specific regions of the desktop. Script 1300 can be used for finding things like the current cursor location. Script 1400 can be used to click on the start button of the desktop (e.g., by using script 1300 and clicking on the returned coordinates).

1. Installer

One challenge in performing dynamic analysis on a malware sample is that the sample may require user interaction to complete installation (e.g., by asking the user to select radio buttons, click "Next," check boxes to agree to terms and conditions, etc.). Application installers, such as Windows installers, typically use message boxes during installation. The buttons/colors of the message boxes are typically standardized for a given version of an operating system due to use of system-wide themes. This standardization allows environment 400 to search for signs that an installation is occurring and efficiently simulate a human victim performing installation steps without the malware sample detecting that the installation is occurring in a virtualized security analysis environment.

Example pseudocode for handling interactive installation dialogues is shown in FIG. 15. After execution of a sample, a screenshot is taken at 1502. Environment 400 can then examine the screenshot for indicators of an installer message box (e.g., by using embodiments of script 1300 or using other appropriate techniques) at 1504. If such indicators are found (1506), environment 400 can then take actions, such as performing optical character recognition (OCR) on text surrounding radio buttons to determine which button to click (e.g., skipping buttons that suggest installation should "NOT" proceed in favor of clicking other buttons). If no radio buttons are present, similar types of buttons (e.g., indicating "continue," "accept," "next," or "finish," etc.) and checkboxes are searched for, including by using OCR, image recognition, or combinations thereof. Portion 1506 loops/repeats until there are no additional buttons (e.g., installation is complete).

2. Example Scenarios

During static analysis, information such as the filetype, malware family, and other characteristics can be determined for a given sample (and included in the static analysis report for the sample). Such information can be used to help choose/configure an execution environment for the sample during dynamic analysis. As an example, if a Yara rule indicates (during static analysis) that the sample may belong to the "Ursnif" family, a specific execution environment that will allow for confirmation of whether or not the sample is a member of the family can be provided during dynamic analysis. As another example, as mentioned above, a malicious document may require particular actions, such as scrolling to a particular page or position in the document (e.g., using a mouse) before its malicious behaviors will be triggered. Whether or not a particular sample is a document (as contrasted with other types of files, such as executables) can be determined (e.g., during static analysis) in advance of environment 400 processing the sample. Knowledge of the filetype in advance of dynamic analysis can help environment 400 to more efficiently simulate the user behaviors most likely to trigger malicious behaviors from the sample (e.g., with environment 400 selecting the profile containing the set of actions most appropriate to take based on the filetype of the sample it is analyzing). Further, which types of actions should be triggered can be periodically refined as new types of threats are encountered/analyzed by security platform 122. For example, if a new type of malicious document, not previously seen by platform 122, is determined (e.g., by researchers) to require a particular sequence of interactions, that set of interactions can be scripted using techniques described herein and added to a future document dynamic analysis profile.

a. Documents

Example pseudocode for handling documents is shown in FIG. 16. After the document is opened by double clicking it, a screenshot is taken at 1602. Environment 400 can then examine the screenshot for warning indicators (e.g., that indicate that the document includes macros) at 1604 (e.g., by using embodiments of script 1300 or other appropriate techniques). Even in a security permissive installation of a particular application (e.g., where all possible security warnings are disabled by default), the application may have at least some basic protections that require a human to intentionally disable during runtime. Document macros can be enabled by locating an appropriate button and clicking it (e.g., using OCR/image recognition techniques, and mouse movement techniques described above) at 1606. The ability to dismiss the security warning using the techniques described herein can be particularly helpful, as meaningful dynamic analysis would likely be difficult without the macro being enabled.

Document specific actions can be taken, an example of which is shown at 1608, which illustrates scrolling down in the document. Other document specific actions can similarly be scripted using combinations of OCR/image recognition and mouse movement techniques described herein (e.g., turning on and off the underline button, clicking a sequence of menu options such as File—Save, and clicking the left and right mouse buttons a threshold number of times). Further, a set of actions (e.g., to be taken with respect to samples having a filetype of document) can be combined into a dynamic analysis profile for that filetype (as described above).

b. Spreadsheets

Example pseudocode for handling spreadsheets is shown in FIG. 17. Such pseudocode can be used (e.g., by environment 400) to discover malware that refrains from executing until a specific worksheet has been viewed.

After the spreadsheet sample is opened by double clicking it, a screenshot is taken at 1702. Environment 400 can then examine the screenshot for indicators that the spreadsheet includes multiple worksheets (e.g., worksheet separators are present) at 1704. One approach for doing this is by using embodiments of script 1300 or other appropriate techniques to determine whether one or more separator icons are present in the screenshot. If such indicators are found (1706), environment 400 can then take an appropriate action, such as clicking on each tab (1708). Other actions can similarly be taken by environment 400 with respect to spreadsheets, such as scrolling through columns and/or rows (e.g., until the cells are empty or a certain number of cells have been scrolled through).

c. Malware Expecting a Browser

Some types of malware (e.g., "Pony") use client browsers to steal credentials. Such malware typically waits to execute until after a browser has been launched and a site to visit has been entered into the URL bar with a keyboard. Example pseudocode for launching a browser and visiting a site is shown in FIG. 18.

After the sample is executed by double clicking it, a screenshot is taken at 1802. Environment 400 can then determine the location of a browser icon on the desktop at 1804 (e.g., by providing script 1200 with the browser icon as input), and click on it (1806). Another screenshot can be taken (1808), and (e.g., using script 1300) the URL bar can be located (1810) and clicked on (1812), and a URL (e.g., www.example.com) can be entered (e.g., by the hypervisor, communicating with a keyboard driver) in accordance with techniques described herein (1814).

d. Reboot

Some malware will wait for a reboot to occur before engaging in malicious behaviors. Embodiments of environment 400 can automatically always perform a reboot while performing dynamic analysis on a sample, and can also determine whether or not to optionally perform a reboot. One example way of determining whether a reboot should be performed is for the hypervisor to perform memory introspection and determine whether the guest OS's list of scheduled tasks has been modified. If so, this indicates that the malware sample has made the modification and the virtual machine should be rebooted. Example pseudocode for triggering a reboot is shown in FIG. 19.

After the sample is executed by double clicking it, a screenshot is taken at 1902. Environment 400 can then determine the location of the start button on the desktop and click it (e.g., using script 1400) at 1904. Another screenshot can be taken (1906), and the shut down option can be located and clicked (1908). Another screenshot can be taken (1910) and the restart type of shutdown can be clicked (1912).

e. Malware Expecting Mouse Movement

Many types of malware implement checks to see if a user is moving the mouse. The mouse can be moved in random directions/locations at random times using techniques described herein.

One particular type of malware that makes use of mouse movements is the Ursnif family of malware. Ursnif malware checks the location of the mouse every few seconds and uses the absolute value of the difference between a current mouse location and a new location as a value for a decryption algorithm. The value can be anything greater than 0. As long as the mouse has moved, decryption will occur. Ursnif can be triggered by causing the hypervisor to move the mouse on the screen randomly and consistently which will create a difference between the two locations.

f. Keylogging Malware

Many types of malware will not execute until a particular key press or sequence of key presses is made. Keystrokes can be made (e.g., by the hypervisor, communicating with a keyboard driver) in accordance with techniques described herein, in applicable patterns to trigger such malware.

g. Malware that Downloads Additional Malware

Many types of malware will, once executed, cause additional files to be downloaded (e.g., to the desktop). By repeating portions 508 and 510 for a period of time (e.g., generating screenshots every 30 seconds for a total of five minutes), such additional downloads can be identified and executed in accordance with techniques described herein. Further, in various embodiments, baseline images are taken of key system folders, such as a download folder (e.g., an initially empty folder, a folder seeded with a default set of benign files, etc.). Using techniques described herein, during dynamic analysis, the download folder can be navigated to and a comparison can be made between a current image of the download folder and the baseline image of the download folder. Any differences indicate that files have been downloaded (e.g., by the malware) and can be executed. Similarly, instead of copying the sample to the desktop and executing it from the desktop as described above, the sample can be copied by the hypervisor to the downloads folder and executed from the downloads folder, as applicable.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a sample for analysis;
generate, prior to execution of the sample, a baseline screenshot of a system folder by accessing frame buffer data stored on a graphics card;
cause the sample to execute, at least in part by using one or more hypervisor instructions to move a pointing device to an icon associated with the sample; and
generate a current screenshot of the system folder by accessing current frame buffer data stored on the graphics card; and
a memory coupled to the processor and configured to provide the processor with instructions.

2. The system of claim 1, wherein the system folder is a downloads folder.

3. The system of claim 1, wherein the processor is further configured to compare the current screenshot to the baseline screenshot.

4. The system of claim 3, wherein comparing the current screenshot to the baseline screenshot includes normalizing the screenshots.

5. The system of claim 3, wherein comparing the current screenshot to the baseline screenshot includes determining a structural similarity index.

6. The system of claim 3, wherein the processor is further configured to take an action in response to a comparison result.

7. The system of claim 6, wherein the action includes performing optical character recognition on the current screenshot.

8. The system of claim 7, wherein the processor is further configured to take the action based on a result of the optical character recognition.

9. The system of claim 6, wherein the action includes moving the pointing device to a pixel location identified as being within a region of a desktop whose content changed between the baseline screenshot and the current screenshot.

10. The system of claim 1, wherein the processor is further configured to determine whether any predetermined artifacts are present in the baseline screenshot.

11. The system of claim 10, wherein the processor is configured to determine whether the predetermined artifacts are present at least in part by performing image recognition on the baseline screenshot.

12. The system of claim 10, wherein the processor is configured to return coordinates of any of the predetermined artifacts determined to be present in the baseline screenshot.

13. The system of claim 1, wherein the processor is further configured to generate a subsequent screenshot of the system folder and compare the subsequent screenshot to at least one of the baseline screenshot and the current screenshot.

14. The system of claim 1, wherein the processor is further configured to trigger a shutdown event prior to the generating of the current screenshot.

15. The system of claim 1, wherein the processor is further configured to cause a launch of an application prior to the generating of the current screenshot.

16. A method, comprising:
receiving a sample for analysis;
generating, prior to execution of the sample, a baseline screenshot of a system folder by accessing frame buffer data stored on a graphics card;
causing the sample to execute, at least in part by using one or more hypervisor instructions to move a pointing device to an icon associated with the sample; and
generating a current screenshot of the system folder by accessing current frame buffer data stored on the graphics card.

17. A non-transitory computer readable storage medium comprising computer instructions for:
receiving a sample for analysis;
generating, prior to execution of the sample, a baseline screenshot of a system folder by accessing frame buffer data stored on a graphics card;
causing the sample to execute, at least in part by using one or more hypervisor instructions to move a pointing device to an icon associated with the sample; and
generating a current screenshot of the system folder by accessing current frame buffer data stored on the graphics card.

18. The method of claim 16, wherein the system folder is a downloads folder.

19. The method of claim 16, further comprising comparing the current screenshot to the baseline screenshot.

20. The method of claim 19, wherein comparing the current screenshot to the baseline screenshot includes normalizing the screenshots.

21. The method of claim 19, wherein comparing the current screenshot to the baseline screenshot includes determining a structural similarity index.

22. The method of claim 19, further comprising taking an action in response to a comparison result.

23. The method of claim 22, wherein the action includes performing optical character recognition on the current screenshot.

24. The method of claim 23, further comprising taking the action based on the result of the optical character recognition.

25. The method of claim 22, wherein the action includes moving the pointing device to a pixel location identified as being within a region of a desktop whose content changed between the baseline screenshot and the current screenshot.

26. The method of claim 16, further comprising determining whether any predetermined artifacts are present in the baseline screenshot.

27. The method of claim 26, wherein determining whether the predetermined artifacts are present includes performing image recognition on the baseline screenshot.

28. The method of claim 26, further comprising returning coordinates of any of the predetermined artifacts determined to be present in the baseline screenshot.

29. The method of claim 16, further comprising generating a subsequent screenshot of the system folder and comparing the subsequent screenshot to at least one of the baseline screenshot and the current screenshot.

30. The method of claim 16, further comprising triggering a shutdown event prior to the generating of the current screenshot.

31. The method of claim 16, furthering comprising causing a launch of an application prior to the generating of the current screenshot.

* * * * *